United States Patent
Spykerman et al.

(10) Patent No.: US 6,290,277 B1
(45) Date of Patent: Sep. 18, 2001

(54) CARGO MANAGEMENT AND ARTICLE SUPPORT SYSTEMS

(76) Inventors: David J. Spykerman, 2633 Spring Ct., Zeeland, MI (US) 49464; Rick A. Anderson, 13636 Lincoln St., Grand Haven, MI (US) 49417; Detlef Zimmermann, Am Eulenhof 15e, D-58239 Schwerte (DE)

(*) Notice: Subject to any disclaimer, the term of this patent is extended or adjusted under 35 U.S.C. 154(b) by 0 days.

(21) Appl. No.: 09/576,644

(22) Filed: May 22, 2000

Related U.S. Application Data

(60) Provisional application No. 60/135,438, filed on May 22, 1999.

(51) Int. Cl.[7] ............................... B60R 5/04; B60R 7/02; B62D 33/08
(52) U.S. Cl. .................... 296/24.1; 296/37.5; 296/37.16; 224/496; 224/542; 224/564; 224/925; 248/235
(58) Field of Search ................................. 296/24.1, 37.5, 296/37.16, 69, 191, 203.01; 224/282, 495, 496, 497, 498, 499, 542, 564, 925; 248/235, 241; 414/537

(56) References Cited

U.S. PATENT DOCUMENTS

| | | | |
|---|---|---|---|
| 3,393,936 | * | 7/1968 | Hall ...................................... 296/24.1 |
| 3,476,432 | * | 11/1969 | Aliment et al. ........................ 296/156 |
| 4,351,555 | * | 9/1982 | Hashimoto .......................... 296/37.16 |
| 4,455,948 | * | 6/1984 | Torres ..................................... 108/44 |
| 5,441,183 | * | 8/1995 | Frenzel .................................. 224/542 |
| 5,669,537 | * | 9/1997 | Saleem et al. ........................ 224/539 |
| 5,716,091 | * | 2/1998 | Wieczorek .......................... 296/37.16 |
| 6,039,378 | * | 3/2000 | Bailey ................................ 296/37.16 |
| 6,050,202 | * | 4/2000 | Thompson .............................. 108/44 |
| 6,062,146 | * | 5/2000 | Conners et al. ......................... 108/44 |
| 6,092,708 | * | 7/2000 | Rand ..................................... 224/542 |
| 6,113,172 | * | 9/2000 | Chaloult et al. .................... 296/26.08 |

FOREIGN PATENT DOCUMENTS

| | | | | |
|---|---|---|---|---|
| 2358233 | * | 6/1974 | (DE) | ................................... 296/24.1 |
| 229556 | * | 7/1987 | (EP) | ................................... 296/24.1 |
| 1019447 | * | 2/1966 | (GB) | ................................... 296/24.1 |
| 474331 | * | 12/1953 | (IT) | ................................... 296/24.1 |
| 61-24640 | * | 2/1986 | (JP) | ................................... 296/37.16 |
| 61-75035 | * | 4/1986 | (JP) | ................................... 296/37.16 |

* cited by examiner

Primary Examiner—D. Glenn Dayoan
Assistant Examiner—Paul Chenevert

(57) ABSTRACT

A cargo system for a vehicle having a floor and a seat that folds and forms a cargo surface. The cargo system includes a cargo platform having a front edge. The cargo platform is connectable to the vehicle for movement between a lowered position with the front edge being located under a portion of the seat and a raised position with the cargo platform being generally aligned with the cargo surface of the seat thereby forming an upper tier and a lower tier.

22 Claims, 6 Drawing Sheets

CARGO MANAGEMENT AND ARTICLE SUPPORT SYSTEMS

This application claims benefit to U.S. application Ser. No. 60/135,438, filed May 22, 1999.

BACKGROUND OF THE INVENTION

1. Technical Field

This invention generally relates to systems utilized to improve the flexibility and usefulness of the interior of a vehicle and, more particularly, to cargo management or article support systems.

2. Discussion

There is an ever increasing requirement from consumers that the interiors of their vehicles provide for a variety of tasks. Cargo management, storage, and providing tray tables or support systems are a few of the major areas of development in recent years. While many systems have been provided which adequately solve many consumer needs, new and innovative solutions are required to meet the changing demands of package constraints in new vehicle design.

SUMMARY OF THE INVENTION

In accordance with the teachings of the present invention, a cargo system is disclosed. The preferred embodiment provides a two-tier cargo system which is preferably supported and allowed to move by use of a linkage mechanism. The cargo system itself can provide additional features which are incorporated within or attached to the cargo platform.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is in no way intended to limit the invention, or its application, or uses.

Figure 1:
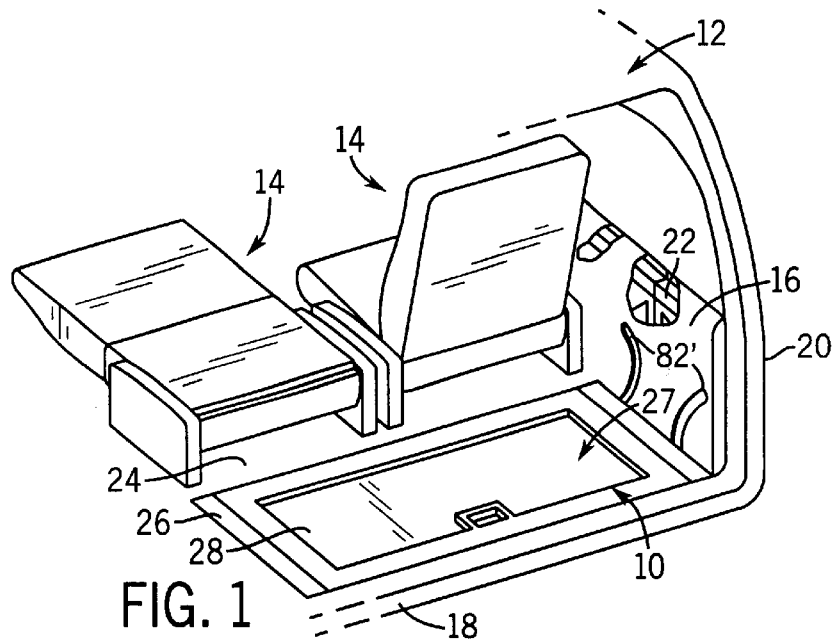
FIGS. 1–11 are rear perspective views showing the two-tier cargo system in a variety of orientations and configurations.
Figure 4:
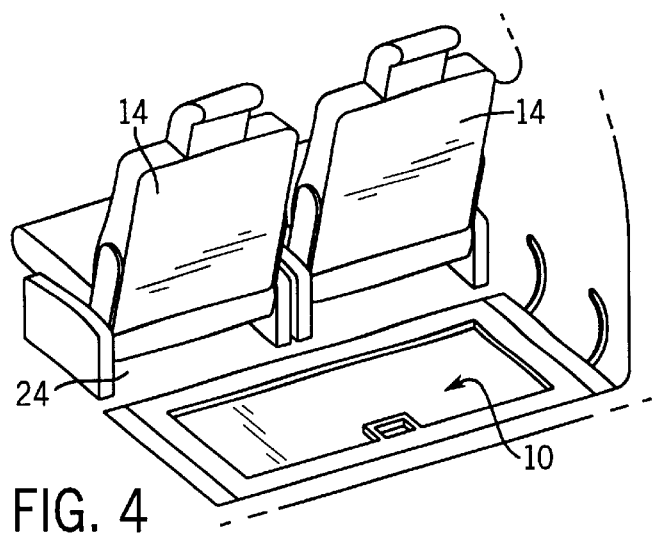

Referring to FIGS. 1 and 4, the two-tier cargo system 10 is shown to be incorporated in a vehicle 12. The vehicle 12 also includes seats 14, interior trim panel 16, lift gate scuff plate 18, body side outer sheet metal 20, body side inner sheet metal 22, and floor 24. The two-tier cargo system 10 is shown in its lowered position wherein the top surface 26 of the cargo platform 27 is generally aligned with and at the same level as floor 24.

Figure 2:
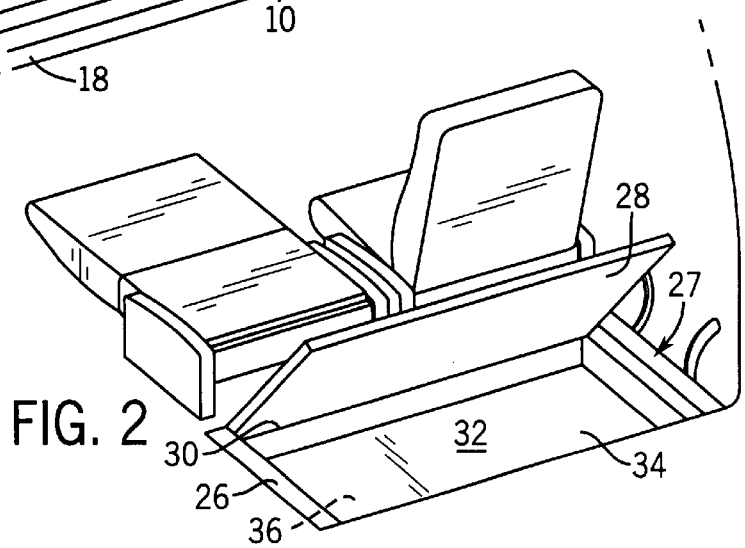

As shown in FIG. 2, the top surface 26 of cargo system 10 can include a pivotally supported lid 28 which when pivoted about hinge 30 provides access to an interior storage area 32. The interior storage area 32 can include a bottom 34 made of the bottom surface 36 of cargo platform 27. Further, the cargo platform 27 can have all or a portion of the bottom surface 36 removed such that access is provided to an interior storage area similar to area 32 but which provides a bottom comprised of a lowered portion of floor 24. This alternate configuration is particularly beneficial if a spare tire or other item having significant height or mass is stored within the interior storage area.

Figure 3:
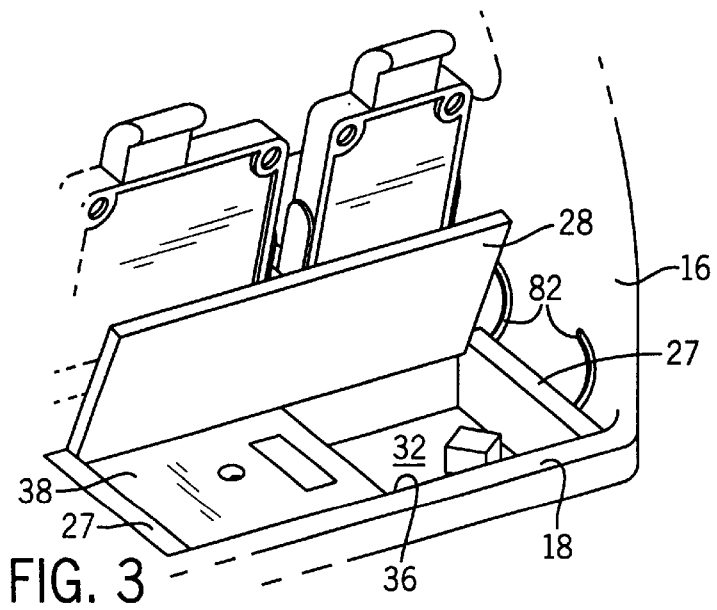

FIG. 3 is illustrative of a combination of an interior storage area 32 wherein the bottom 34 of the storage area is defined by the bottom surface 36 of platform 27 on the right-hand side of the platform 27, while the left-hand portion of platform 27 provides a cover 38 supported by floor 24 and used to conceal an item such as a spare tire. Cover 38 would remain in its location on the floor when cargo platform 27 is raised to its elevated position (as shown in FIG. 6).

Figure 5:
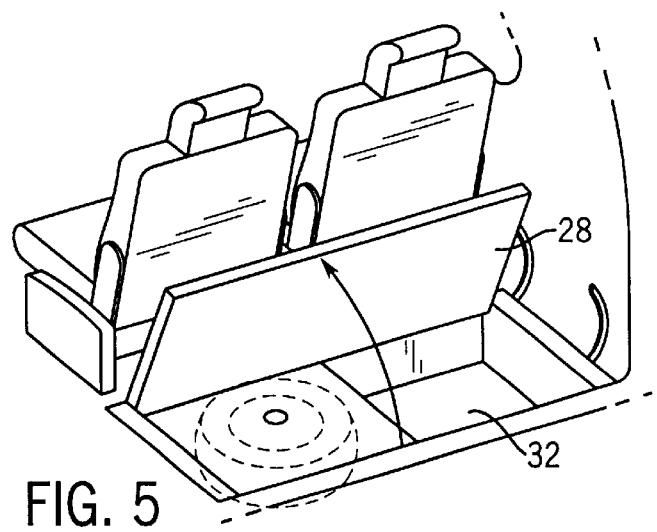

FIG. 5 shows an alternate configuration wherein the spare tire is carried below the floor 24 and on the exterior of the vehicle while an interior storage area 32 is provided in a portion of cargo platform 27. One skilled in the art would readily recognize that multiple storage areas could be included of varying sizes and shapes depending upon the particular configuration and package constraints of the vehicle in which cargo system 10 is incorporated.

Figure 7:
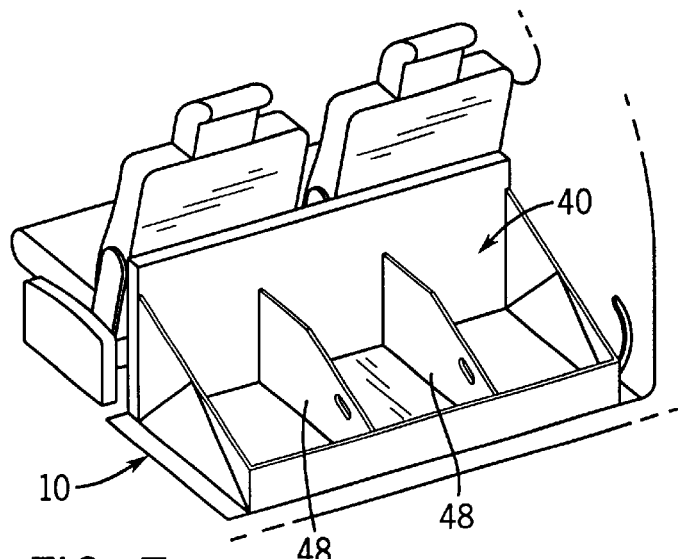
Figure 8:
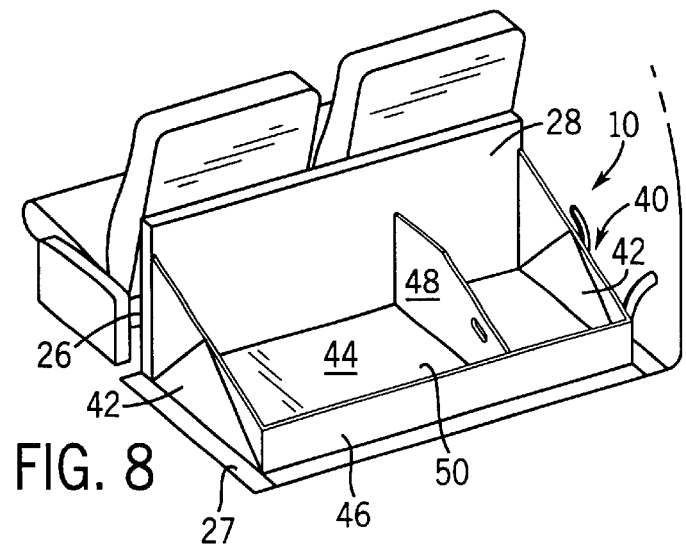

Referring to FIGS. 7 and 8, cargo system 10 is shown to incorporate a collapsible cargo management device 40. Cargo management device 40 is shown to be incorporated within cargo platform 27 and located between top surface 26 and bottom surface 36 when lid 28 is in a closed position. When lid 28 is pivoted to an open position as shown, side walls 42 unfold and create a bounded storage area 44. The storage area 44 is bounded along a forward wall by lid 28, along each side by side walls 42, and along a rearward edge by rear wall 46. One or more partitions or dividers 48 can be used within the cargo management device 40 to partition the storage area 44 into a plurality of compartments. Dividers 48 can either be removable or, in a preferred embodiment, pivotally connected to a lower surface 50 of storage area 44. The dividers 48 are folded to a flat condition along lower surface 50 prior to closing lid 28 which collapses cargo management device 40 back into a stored position.

Figure 6:
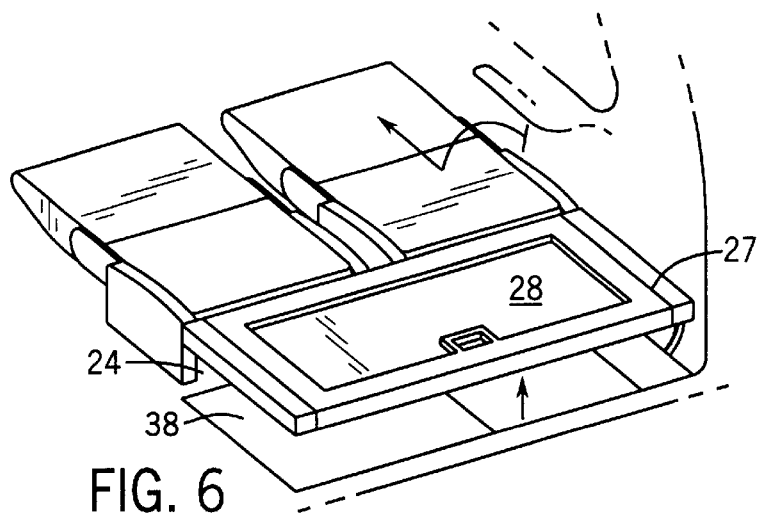
Figure 9:
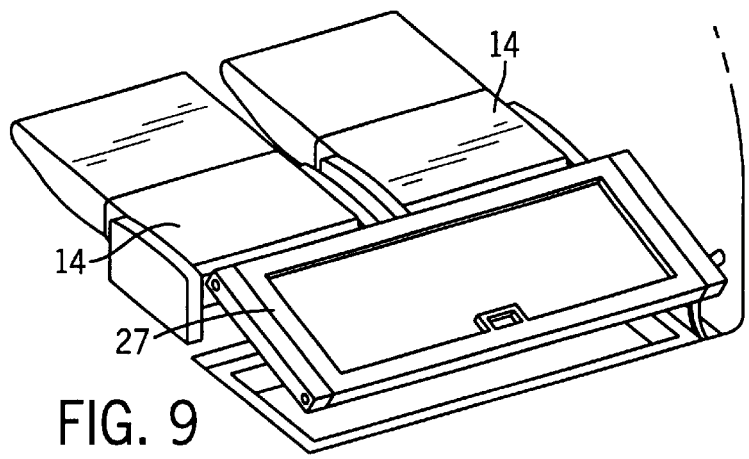
Figure 10:
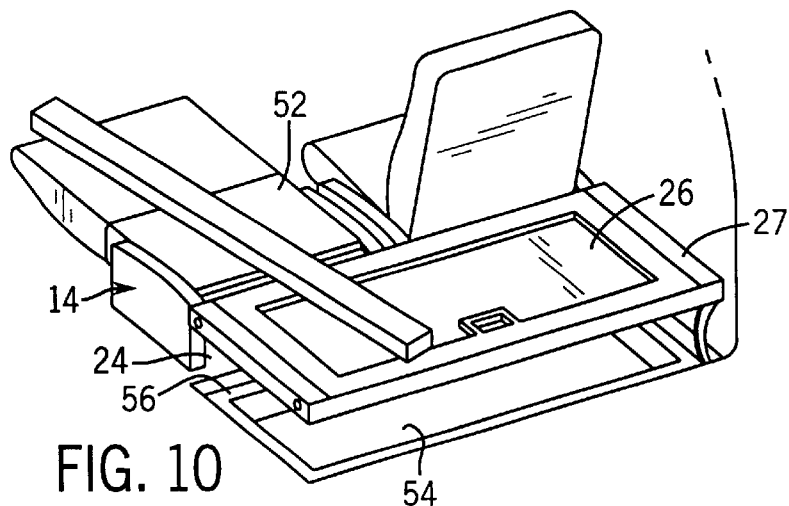

Referring to FIG. 9, cargo platform 27 is shown in an intermediary position between the lowered position previously shown and the raised position such as shown in FIGS. 6 and 10. Depending upon the particular linkage system, the motion of platform 27 between the lowered position and the raised position will vary as will be described in detail below.

Referring to FIG. 10, cargo platform 27 is shown in a raised position wherein top surface 26 is now generally aligned with and substantially planar to a cargo surface 52 on seat 14. The raised position of cargo platform 27 provides an upper tier for storing cargo (such as the lumber shown) and a lower tier which is protected from the cargo above. The structural integrity of cargo platform 27 provides protection for the items which may be stored in the lower tier and which rest in the depression 54 formed in the floor 24. The depression 54 shown can be of varying depths depending upon the particular space available within the vehicle architecture, but preferably includes a support lip 56 upon which cargo platform 27 is peripherally supported when in the lowered position. Due to the constraints within some vehicle architectures, the support lip 56 will be the same depth as the remainder of depression 54 and form a single continuous plane essentially the thickness of cargo platform 27 below the normal level of the floor 24.

Figure 11:
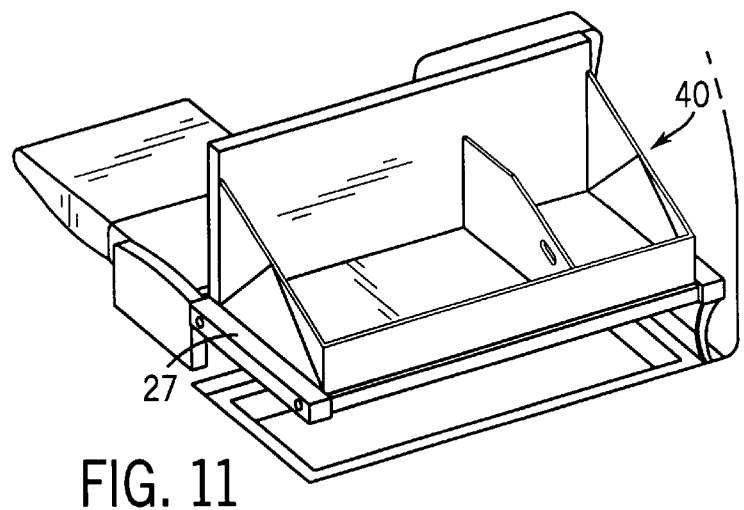

As shown in FIG. 11, the collapsible cargo management device 40 shown in FIG. 8 can also be deployed and utilized when cargo platform 27 is in the raised position. Further, while not shown, it will be appreciated by one skilled in the art that an interior storage area 32 as shown in FIGS. 2, 3, and 5, can also be utilized when the cargo platform 27 is in the raised position.

Figure 12A:
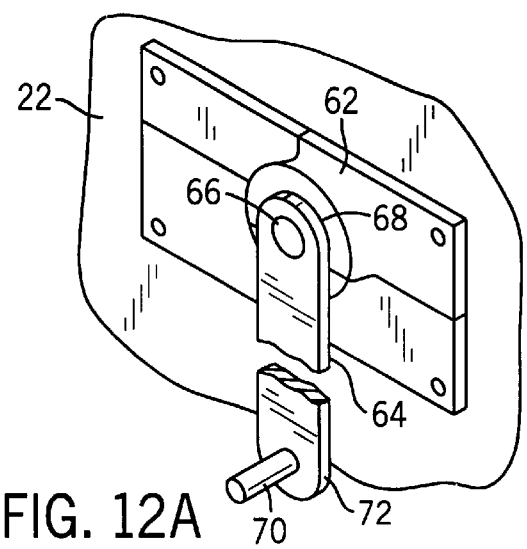
FIGS. 12 and 13 are side views showing the four-bar linkage system preferably used in the two-tier cargo system.
Figure 12:
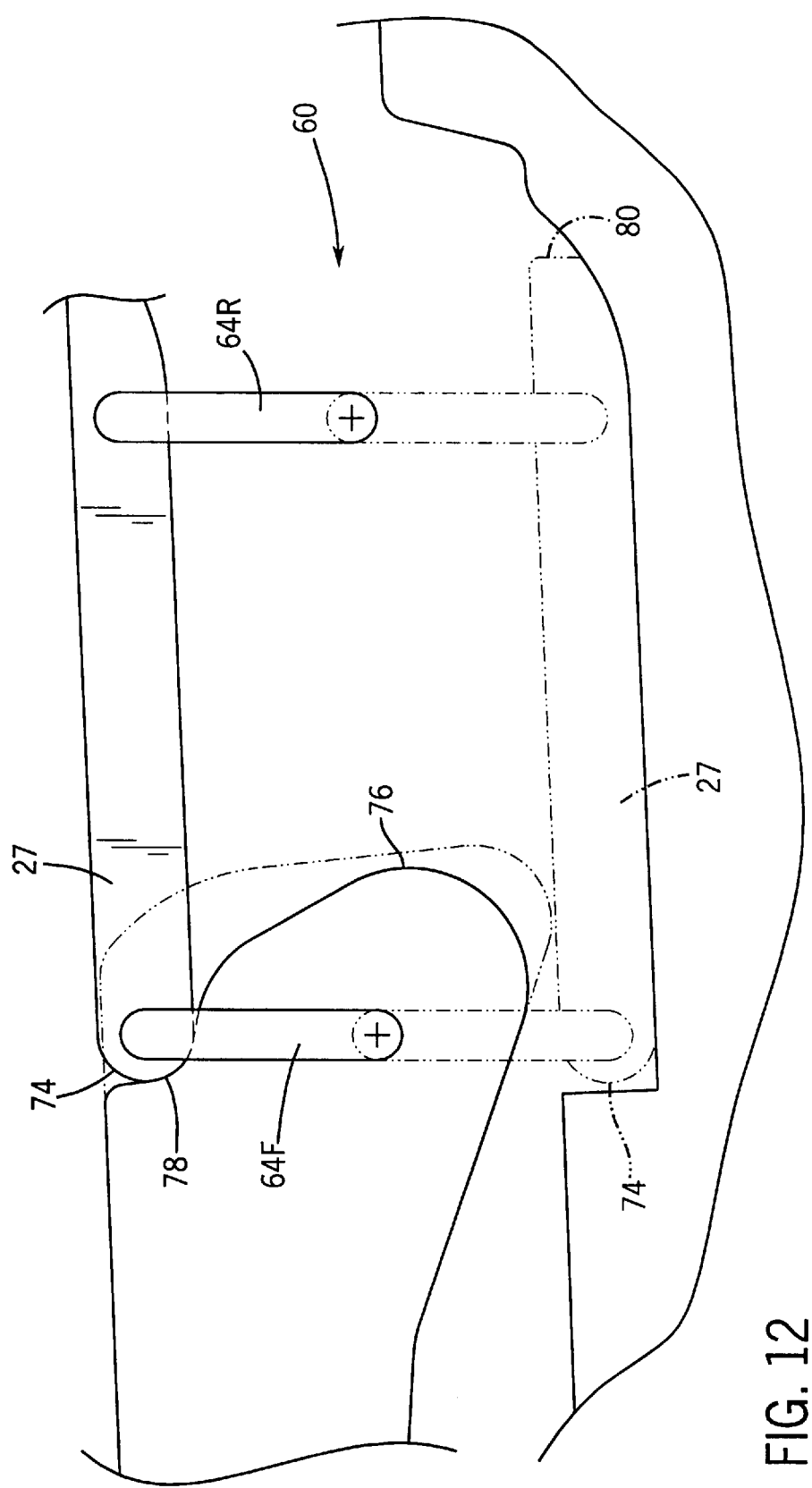

Referring now to FIGS. 12 and 12a, the linkage mechanism 60 which supports and allows cargo platform 27 to move from the lowered position to the raised position is shown. In a preferred embodiment, a bracket 62 is secured to the body side inner sheet metal 22 at four different locations. Each bracket 62 supports a link 64 about a fixed pivot point 66. Link 64 is freely rotatable about the fixed pivot point 66 at a first end 68 and provides a pivot pin 70 at a distal second end 72. Cargo platform 27 is pivotally attached to each of the four pivot pins 70 on the four links 64 which are within linkage mechanism 60.

Cargo platform 27 and links 64 are shown in their lowered position by the cross hatched portion of FIG. 12. As cargo platform 27 is moved from the lowered position to the upper position, the pair of forward links 64F and the pair of rear links 64R constrain the motion of the platform 27 as it pivots about the pins 70 and each link 64 pivots about fixed pivot point 66. The constrained, arcuate motion of cargo platform 27 allows the forward edge 74 of the platform 27 to avoid interfering with the seat surface 76 and preferably, but need not, rest on a support formation 78 formed on the surface 76 of seat 14.

While not specifically shown, one skilled in the art will readily recognize that a wide variety of locking mechanisms can be utilized to secure links 64 in their upper and lower positions. By locking links 64 when in the upper position, platform 27 can be secured in the raised position and provide adequate support for reasonable cargo loading. Further, it is preferable that a locking mechanism be provided when the links 64 are in their lowered position so as to avoid any undesirable motion or rattling of platform 27 when in the lowered position.

Further, one skilled in the art will readily recognize that one or more intermediate lock positions can be incorporated within the arcuate path of platform 27. By providing the intermediate locking positions, the rearward edge 80 of platform 27 can be extended rearward in vehicle 12 up to one half the difference in height between the lowered position and the raised position of platform 27. Depending upon the height difference and the particular vehicle architecture, this rearward motion provides a surface which extends beyond the lift gate or door opening and provides a work surface that can be conveniently used by a person standing outside of the vehicle.

With brief reference to FIG. 3, slots 82 are shown in interior trim panel 16 which provide clearance for pivot pins 70 during the transitional motion between the lowered position and the raised position of platform 27. Depending upon the particular motion created by linkage mechanism 60, the pattern or path of slots 82 will vary as can be appreciated by one skilled in the art.

Figure 13:
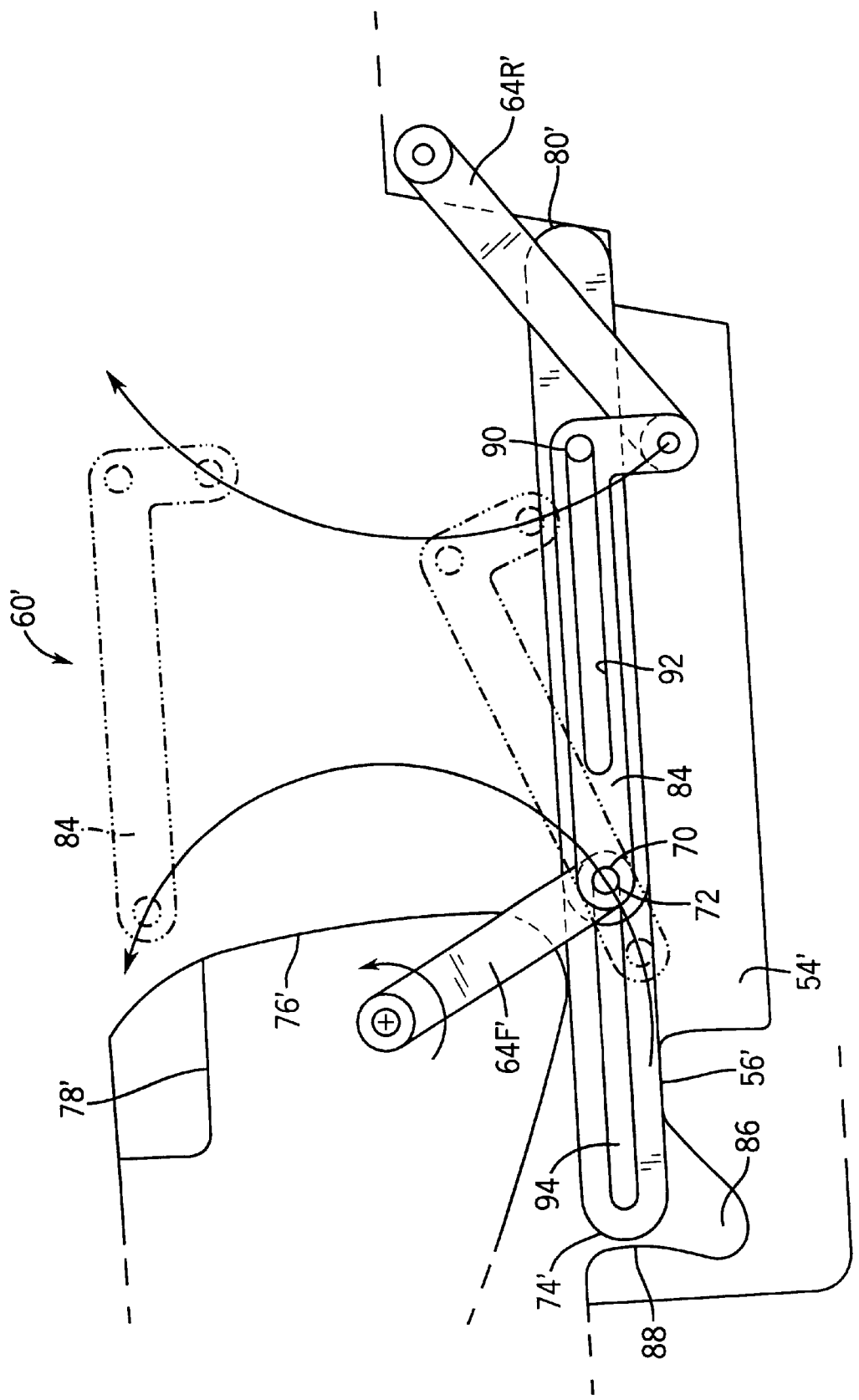

Referring now to FIG. 13, an alternate linkage mechanism 60' is shown. Mechanism 60' includes brackets 62 and fixed pivot points 66 as in FIG. 12a. Further, mechanism 60' also includes front links 64F' and rear links 64R' as well as a slotted intermediary bracket 84. Intermediary bracket 84 is required in linkage mechanism 60' in order to provide the appropriate translational motion between the lowered position and the raised position of platform 27 so the forward edge 74' does not interfere with the seat surface 76' as the platform 27 articulates from the lowered position to the raised position. The motion of platform 27 when articulating from the lowered position to the raised position can best be described as first raising the rearward edge 80' such that link 64R' rotates in a clockwise direction. This rotation causes the platform 27 to raise at an angle as the forward edge 74' moves somewhat downward and forward into a recess 86 provided in depression 54'. Note that a support lip 56' can be included rearward of the forward edge 88 of depression 54'. Next, platform 27 is raised upward and rearward generally toward the person raising the platform 27 as rear link 64' continues to arc through its motion. Link 64F' is preferably spring biased such that the forward edge 74' automatically raises once platform 27 has been raised to a specific level at its rearward edge 80'. An engagement pin 90 extends from platform 27 and engages a slot 92 in intermediary bracket 84. Further, a coordinated slot 94 is provided in cargo platform 27 which coordinates with pin 70 at the distal second end 72 of link 64F'.

It would be appreciated by one skilled in the art that locking mechanisms similar to those previously described can also be utilized in conjunction with linkage mechanism 60' as it was with linkage mechanism 60. Further, a support formation 78' can optionally be included in seat surface 76' if allowed or required by the package constraints and architecture of the vehicle. With brief reference to FIG. 1, slots 82' are shown which coordinate with the combined clockwise and counterclockwise motion of links 64R' and 64F', respectively, of linkage mechanism 60'.

The foregoing discussion discloses and describes a preferred embodiment of the present invention. One skilled in the art will readily recognize from such discussion, and from the accompanying drawings that various changes, modifications, and variations can be made therein without departing from the true spirit and fair scope of the invention.

We claim:

1. A cargo system for a vehicle having a floor and a seat that folds and forms a cargo surface, said cargo system comprising:

a cargo platform having a front edge, said cargo platform being connected to the vehicle for movement between a lowered position with said front edge being located under a portion of the seat and a raised position with said cargo platform being generally aligned with the cargo surface of the seat thereby forming an upper tier and a lower tier, without disconnecting to cargo platform from the vehicle.

2. The cargo system of claim 1 further comprising a bracket connectable to the vehicle for movement between a lowered position and a raised position, said cargo platform being connected to said bracket for sliding movement between a forward position and a rearward position.

3. The cargo system of claim 2 wherein said bracket includes a front end connectable to the vehicle for arcuate movement.

4. The cargo system of claim 3 further comprising a front link pivotally connectable to the vehicle and pivotally connected to said front end of said bracket.

5. The cargo system of claim 3 wherein said front end of said bracket includes a first pin engageable with a first arcuate track of the vehicle.

6. The cargo system of claim 3 wherein said bracket includes a rear end connectable to the vehicle for arcuate movement.

7. The cargo system of claim 6 further comprising a front link pivotally connectable to the vehicle and pivotally connected to said front end of said bracket, and a rear link pivotally connectable to the vehicle and pivotally connected to said rear end of said bracket.

8. The cargo system of claim 7 wherein said front end of said bracket includes a first pin engageable with a first arcuate track of the vehicle, and said rear end of said bracket includes a second pin engageable with a second arcuate track of the vehicle.

9. The cargo system of claim 3 wherein said cargo platform includes a rear edge, and said cargo platform is connectable to the vehicle for movement into an intermediary position with said front edge being generally aligned with the cargo surface and said rear edge being generally aligned with the floor thereby forming a cargo ramp.

10. The cargo system of claim 9 further comprising a lid connected to said cargo platform for movement between an open position and a closed position.

11. The cargo system of claim 10 wherein said lid is pivotally connected to said cargo platform proximate said front edge.

12. The cargo system of claim 11 wherein said lid provides access to said lower tier when said cargo platform is moved into the raised position and said lid is moved into the open position.

13. The cargo system of claim 11 further comprising a first collapsible sidewall connected to said cargo platform and to said lid for coordinated movement with said lid between a collapsed position with said first collapsible sidewall being generally planar to said lid and an extended position with said first collapsible sidewall being generally perpendicular to said lid.

14. The cargo system of claim 13 further comprising a second collapsible sidewall connected to said cargo platform and to said lid for coordinated movement with said lid between a collapsed position with said second collapsible sidewall being generally planar to said lid and an extended position with said second collapsible sidewall being generally perpendicular to said lid.

15. The cargo system of claim 14 wherein said first and second collapsible sidewalls form a bounded storage area when said lid is pivotally moved into the open position and said first and second collapsible sidewalls are moved into the extended position.

16. A cargo system for a vehicle having a floor and a seat that folds and forms a cargo surface, and said cargo system comprising:

a cargo platform having a front edge and a rear edge, said cargo platform being connectable to the vehicle for movement between a lowered position with said cargo platform being generally aligned with the floor, a raised position with said cargo platform being generally aligned with the cargo surface of the seat thereby forming an upper tier and a lower tier, and an intermediary position with said front edge being generally aligned with the cargo surface and said rear edge being generally aligned with the floor thereby forming a cargo ramp.

17. The cargo system of claim 16 further comprising a lid connected to said cargo platform for movement between an open position and a closed position.

18. The cargo system of claim 17 wherein said lid is pivotally connected to said cargo platform proximate said front edge.

19. The cargo system of claim 18 wherein said lid provides access to said lower tier when said cargo platform is moved into the raised position and said lid is moved into the open position.

20. The cargo system of claim 18 further comprising a first collapsible sidewall connected to said cargo platform and to said lid for coordinated movement with said lid between a collapsed position with said first collapsible sidewall being generally planar to said lid and an extended position with said first collapsible sidewall being generally perpendicular to said lid.

21. The cargo system of claim 20 further comprising a second collapsible sidewall connected to said cargo platform and to said lid for coordinated movement with said lid between a collapsed position with said second collapsible sidewall being generally planar to said lid and an extended position with said second collapsible sidewall being generally perpendicular to said lid.

22. The cargo system of claim 21 wherein said first and second collapsible sidewalls form a bounded storage area when said lid is pivotally moved into the open position and said first and second collapsible sidewalls are moved into the extended position.

* * * * *

UNITED STATES PATENT AND TRADEMARK OFFICE
CERTIFICATE OF CORRECTION

PATENT NO.    : 6,290,277 B1
DATED         : September 18, 2001
INVENTOR(S)   : Spykerman et al.

It is certified that error appears in the above-identified patent and that said Letters Patent is hereby corrected as shown below:

<u>Title page,</u>
Item [73], Assignee should read -- Johnson Controls Interiors Technology Corp., Holland, Michigan --.
The *Attorney, Agent,* or *Firm* should read -- Foley & Lardner --.

Signed and Sealed this

Second Day of July, 2002

*Attest:*

*Attesting Officer*

JAMES E. ROGAN
*Director of the United States Patent and Trademark Office*